(12) United States Patent
Rapisarda

(10) Patent No.: US 8,923,006 B2
(45) Date of Patent: Dec. 30, 2014

(54) ASSEMBLY WITH LED HOUSING

(71) Applicant: Carmen Rapisarda, Apple Valley, CA (US)

(72) Inventor: Carmen Rapisarda, Apple Valley, CA (US)

(*) Notice: Subject to any disclaimer, the term of this patent is extended or adjusted under 35 U.S.C. 154(b) by 130 days.

(21) Appl. No.: 13/646,311

(22) Filed: Oct. 5, 2012

(65) Prior Publication Data

US 2013/0120994 A1 May 16, 2013

Related U.S. Application Data

(63) Continuation of application No. 13/294,095, filed on Nov. 10, 2011.

(51) Int. Cl.
| | | |
|---|---|---|
| *F21S 4/00* | (2006.01) | |
| *F21V 23/02* | (2006.01) | |
| *H01M 2/10* | (2006.01) | |
| *A43B 3/00* | (2006.01) | |
| *F21K 99/00* | (2010.01) | |
| *H01M 2/20* | (2006.01) | |

(52) U.S. Cl.
CPC ............ *F21V 23/023* (2013.01); *F21K 9/30* (2013.01); *H01M 2/20* (2013.01); *H01M 2/1044* (2013.01); *A43B 3/001* (2013.01); *F21K 9/90* (2013.01)
USPC .................... 361/760; 361/748; 362/249.01

(58) Field of Classification Search
USPC ............ 361/748, 760; 362/249.01–249.19
See application file for complete search history.

(56) References Cited

U.S. PATENT DOCUMENTS

| | | | |
|---|---|---|---|
| 2,751,570 A | 6/1956 | Broaka | |
| 3,988,707 A | 10/1976 | Moser et al. | |
| 4,140,360 A | 2/1979 | Huber | |
| 4,405,187 A | 9/1983 | Muller et al. | |
| 4,758,927 A | 7/1988 | Berg | |
| 5,881,453 A | 3/1999 | Avery et al. | |
| 5,947,580 A | 9/1999 | Chien | |
| 6,062,901 A | 5/2000 | Liu et al. | |
| 6,991,488 B2 | 1/2006 | Freakes | |
| 7,147,337 B1 | 12/2006 | Rapisarda | |
| 7,556,543 B2 | 7/2009 | Weber | |
| 7,591,672 B2 | 9/2009 | Wu | |
| 8,004,856 B2 | 8/2011 | Rapisarda | |
| 2001/0037565 A1 | 11/2001 | Prasad et al. | |
| 2006/0107523 A1 | 5/2006 | Blossfeld et al. | |
| 2011/0096545 A1* | 4/2011 | Chang ................ | 362/249.02 |

OTHER PUBLICATIONS

TE Connectivity; CoelSplice Connectors for Lighting Applications Offer Easy Terminations, Options for Wire Confirgurations, Style and Space Savings; Apr. 12, 2011; TE Connectivity.

* cited by examiner

*Primary Examiner* — Sean Gramling
(74) *Attorney, Agent, or Firm* — Roy L. Anderson; Wagner, Anderson & Bright PC

(57) ABSTRACT

An assembly includes an LED with two conductive leads, two conductive wires in which an insulator surrounds a conductor, and a housing. The two conductive wires are inserted into and held by a wire cavity of the housing. Each of the two conductive leads is inserted into a different LED lead hole of the housing. Electrical contact is made by each of the two conductive leads with the conductor of one of the two conductive wires and the LED is held by the housing. The conductive leads can have a sharp point that penetrates the insulator and the conductor when the LED is inserted into the housing. The LED can be seated in a LED cavity of the housing while insertion of the LED into the LED cavity creates an interference fit in which conductive portions of the wires opposite the exposed conductors are compressed against the housing.

8 Claims, 10 Drawing Sheets

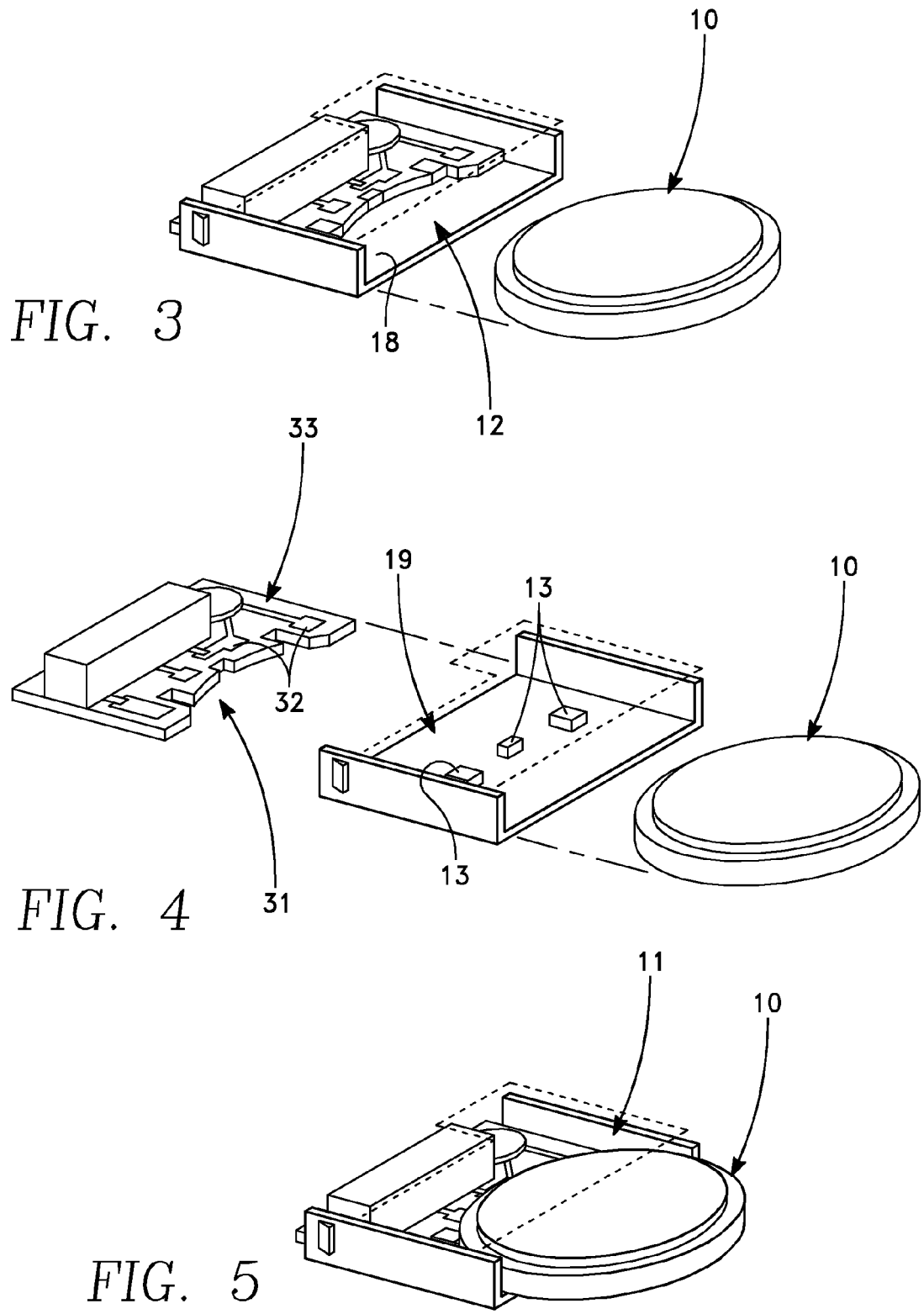

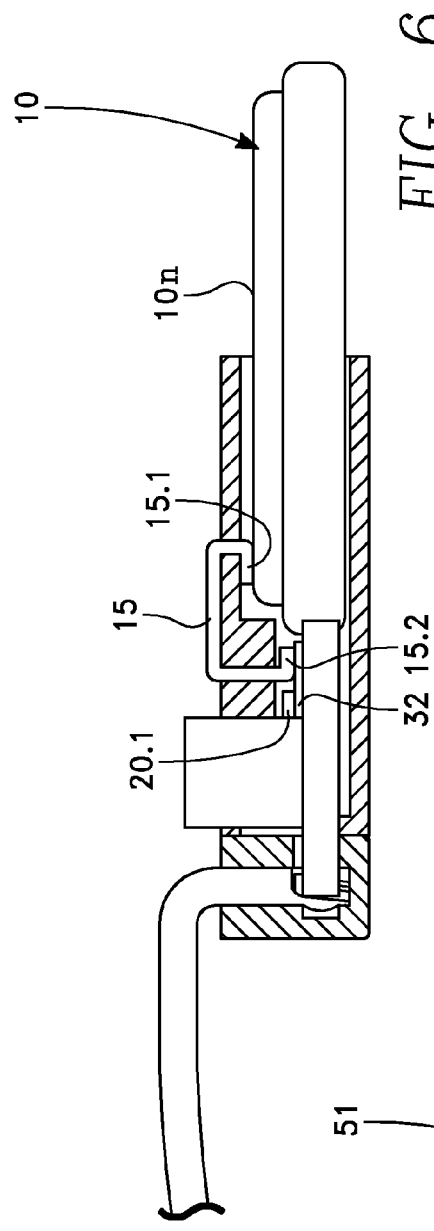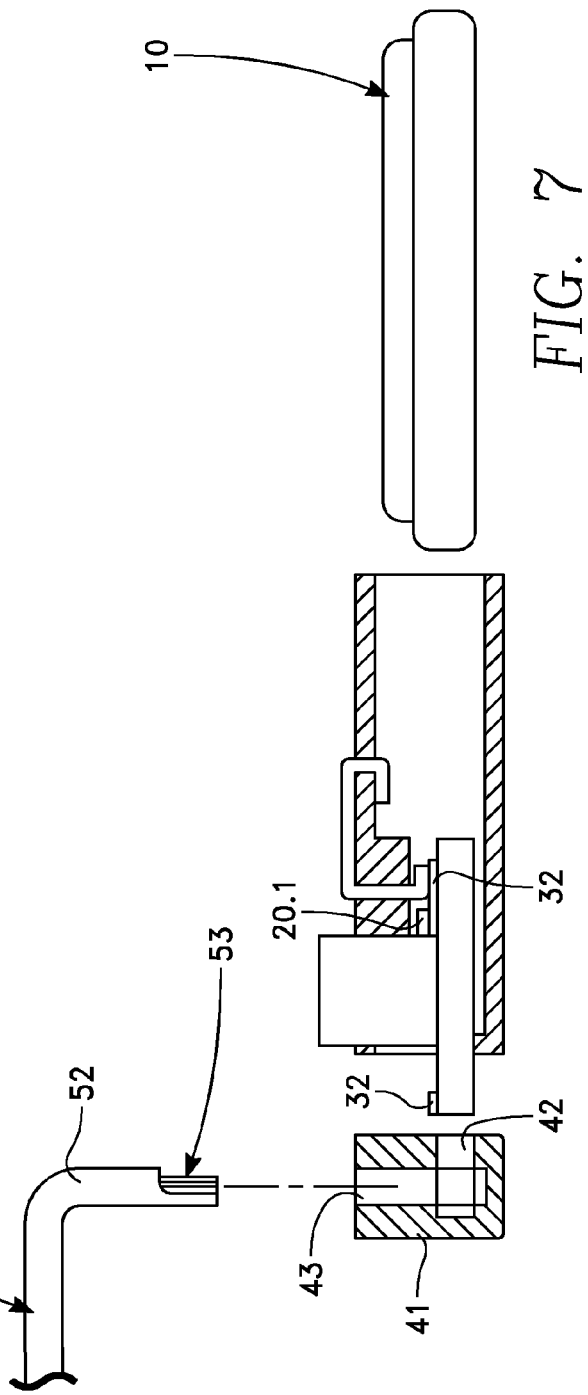

ASSEMBLY WITH LED HOUSING

CROSS REFERENCE TO RELATED APPLICATIONS

This application is a continuation-in-part of U.S. Ser. No. 13/294,095, filed Nov. 10, 2011, entitled Solder-Less Electrical Assembly and Process for its Manufacture, the disclosure of which is specifically incorporated herein by reference. This application is related to two other patent applications being filed the same day that are also continuation-in-part applications of U.S. Ser. No. 13/294,095, the disclosures of which are also incorporated herein by reference.

FIELD OF THE INVENTION

The present invention is in the field of solder-less electrical assemblies.

BACKGROUND OF THE INVENTION

Electrical assemblies have long used lead solder to help make and keep electrical connections. However, use of solder, and especially lead solder, has come under increasing criticism due to environmental concerns.

The present invention is especially well-suited for, but not limited to use in, footwear, wearing apparel and toys. For an electrical assembly to be useful in such fields it must be compact and inexpensive to manufacture. This means that both the number of parts, as well as the number of manufacturing steps, must be kept to the bare minimum if one is to be competitive in the world today.

The present invention advances simple, compact and easy to manufacture electrical assemblies that are well-suited for use in a variety of applications, including footwear, apparel and toys.

The present invention improves upon prior inventions of the same inventor, including U.S. Pat. Nos. 7,147,337 and 8,004,856.

SUMMARY OF THE INVENTION

The present invention is generally directed to an assembly which includes an LED with two conductive leads, two conductive wires in which an insulator surrounds a conductor, and a housing. The two conductive wires are inserted into and held by a wire cavity of the housing. Each of the two conductive leads is inserted into a different LED lead hole of the housing. Electrical contact is made by each of the two conductive leads with the conductor of one of the two conductive wires and the LED is held by the housing.

The conductive leads can have a sharp point that penetrates the insulator and the conductor when the LED is inserted into the housing. The LED can be seated in a LED cavity of the housing while insertion of the LED into the LED cavity creates an interference fit in which conductive portions of the wires opposite the exposed conductors are compressed against the housing. A conductive wire can also be held in a resilient housing by an interference fit between the conductor and the housing. The LED lead holes can be channels to guide each of the two LED leads into alignment (and/or move them closer together or further apart) so as to create the electrical contact and such alignment need not be perpendicular to the two wires. Multiple LEDs can be mounted on a pair of conductive wires, with one LED mounted at the termination of such wires, and no solder is required in any such assembly.

Accordingly, it is a primary object of the present invention to provide an improved assembly useful with LEDs.

This and further objects and advantages will be apparent to those skilled in the art in connection with the drawings and the detailed description of the invention set forth below.

BRIEF DESCRIPTION OF THE DRAWINGS

FIG. 1 is an exploded assembly drawing illustrating one electrical assembly according to the present invention while

FIG. 3 illustrates a battery block of the electrical assembly of FIG. 1 showing the block with its battery removed, looking into a side view from the direction in which a battery would be inserted, FIG. 4 is a partially exploded view of FIG. 3, and FIG. 5 is an assembled view of FIG. 3.

FIG. 6 is a side view of the electrical assembly of FIG. 1.

FIG. 7 is a partially exploded view of FIG. 6.

FIG. 9 illustrates an LED block which holds an LED at an end of a wire pair while

FIG. 11 is a top view of an LED block illustrating how the LED leads are aligned to connect with the wire while

FIG. 13 is a side view of an LED block showing an LED to be inserted while

FIG. 14 illustrates its insertion.

FIG. 15 illustrates how an LED block can channel and align LED leads to make contact with conductive members of a wire pair while FIG. 16 illustrates insertion of an LED into an end of a wire pair.

FIG. 18 is an exploded view of the interconnector while

DETAILED DESCRIPTION OF THE INVENTION

The present invention details how various parts can easily be assembled without the use of solder. Although not limited to a final assembly, the present invention is especially well suited to assembly of a package useful for controlling lighting of multiple light emitting diodes ("LEDs") through movement, which itself is useful in a variety of products, such as, for example, footwear, clothing and toys. It bears note, however, that techniques and assemblies described herein in connection with such usage can be applied to many additional fields.

In the Figures and the following description, number designations indicate various features of the invention, with like number designations referring to like features throughout both the drawings and the description. Although the Figures are described in greater detail below, the following is a glossary of the elements identified in the Figures.

Figure 1:
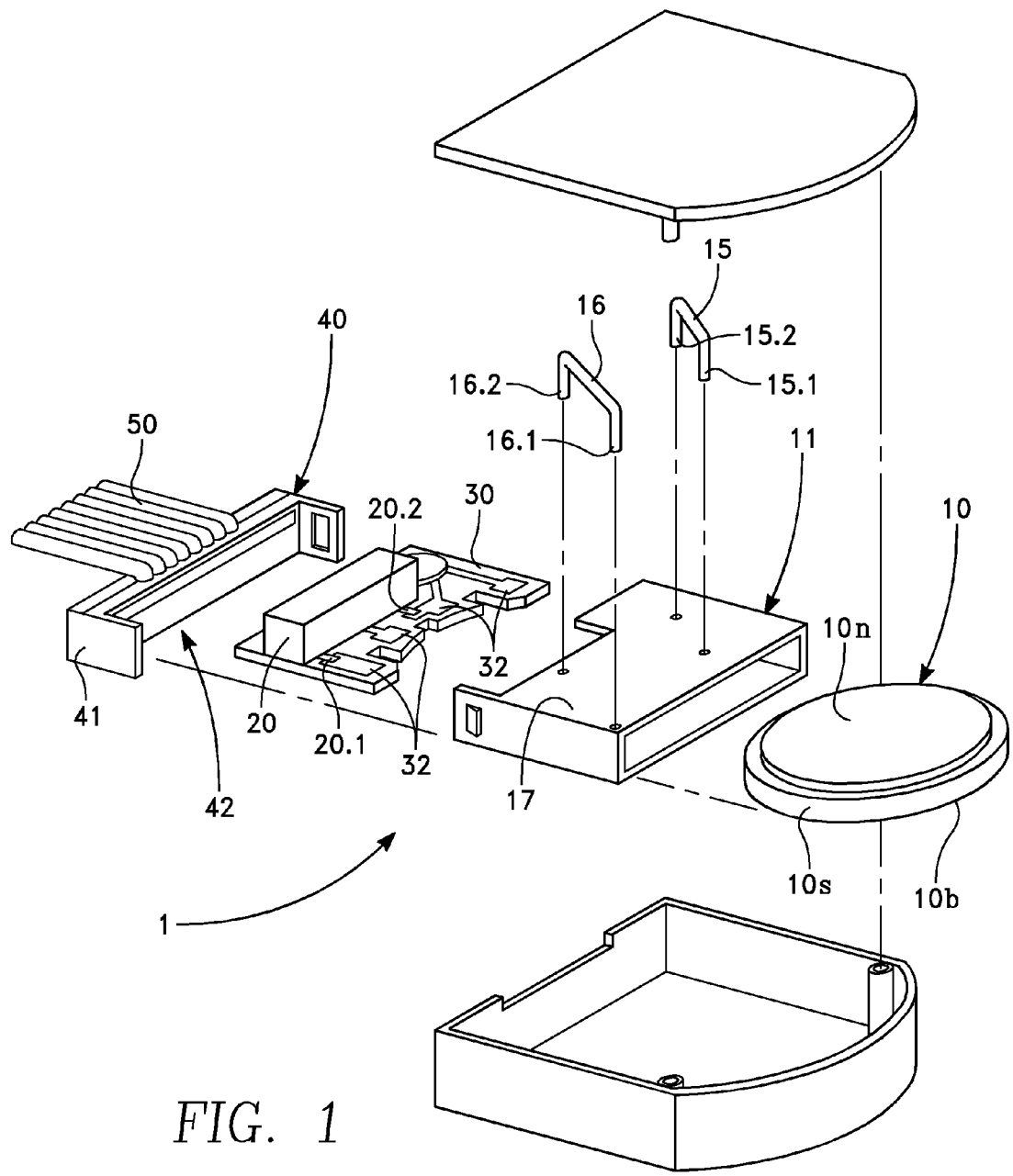

GLOSSARY 1 electrical assembly
10 battery
10b bottom surface of battery 10
10n negative surface of battery 10
10s side surface of battery 10
11 battery block
12 battery opening (in battery block 11)
13 column
15 conductor
15.1 first lead of conductor 15
15.2 second lead of conductor 15
16 conductor
16.1 first lead of conductor 16
16.2 second lead of conductor 16
17 top surface
18 bottom surface
19 PCB opening (in battery block 11)
20 switch assembly
20.1 first switch assembly lead
20.2 second switch assembly lead
30 printed circuit board ("PCB")
31 radius (in PCB 30)
32 conductive traces and pads
33 electronics
40 ribbon block assembly
41 ribbon block
42 PCB opening (in ribbon block 41)
43 ribbon opening (in ribbon block 41)
50 ribbon wire assembly
51 conductive wire
52 insulative covering (surrounding a conductive wire 51)
53 stripped portion of insulative covering 52
60 light emitting diode ("LED")
61.1 first LED lead
61.2 second LED lead
62 sharp pin point
65 LED base
70 LED block
71 wire hole
72 LED lead cavity
73 cavity (in which LED 60 is seated)
74 stress reliever
100 outer case
101 case cover
102 case bottom
103 male member
104 female member FIG. 1 illustrates an assembly, shown generally as 1, that has multiple subcomponents that are assembled together—one or more batteries 10, a battery block 11, a switch assembly 20, a PCB 30, a ribbon block assembly 40, and two conductors, 15 and 16. The ribbon block assembly 40 may have its own subassemblies attached to its other end, and/or support multiple LEDs in parallel, as will be discussed below.

Battery 10, in an especially preferred embodiment, is a lithium 3 volt button cell battery. This type of battery allows positive electrical contact to be made with its upper negative surface 10n and positive electrical contact to be made with either its side surfaces 10s or its bottom surface 10b. In an alternative embodiment, more than one battery can be stacked on top of each other.

Battery block 11, shown in FIGS. 3-5, in an especially preferred embodiment, is molded from resilient material, such as plastic. Two conductors, 15 and 16, are attached to battery block 11 in either one or two assembly steps. Conductors 15 and 16 can be forced through a wall of battery block 11 or preformed holes or pilot holes (not shown) can be used to assist in this assembly step. Conductors 15 and 16, which might be thought of as resembling u-shaped staples, are made of electrically conductive materials and each has two leads that extend down into an interior cavity of battery block where they will make electrical contact as is described later. In one embodiment of the invention, conductors 15 and 16 are staples that are assembled by a stapling step.

After conductors 15 and 16 have been assembled to battery block 11, battery 10 is inserted into battery opening 12 formed in battery block 11 where it will be held in place by an interference fit. During insertion of battery 10 into battery opening 12, first lead 15.1 of conductor 15 will come into contact with negative surface 10n of battery 10 and be bent over due to the insertion process (see FIG. 6) to secure electrical contact with the battery. Bending first lead 15.1, in an especially preferred embodiment, also assists with creating a more secure interference fit to hold battery 10 in place due to resiliency of the battery block material which forces now bent first lead 15.1 against battery 10. During the same insertion step first lead 16.1 of conductor 16 will make positive electrical contact with battery 10 and, in an especially preferred embodiment, the electrical contact will be made with a side surface 10s of battery 10. Making electrical contact with side surface 10s is especially preferred because it allows both conductors 15 and 16 to be assembled to the same surface of battery block 11, although conductor 16 could alternatively be assembled to a bottom surface and make electrical contact with bottom surface 10b of battery 10 in the same manner as was done with electrical conductor 15 and negative surface 10n.

FIGS. 3-5 show an especially preferred embodiment of the present invention in which three columns or ribs 13 help stabilize battery block 10 when a PCB 30 is inserted into PCB opening 19 in battery block 11. Each column 13 provides structural support to prevent top surface 17 from bowing away from bottom surface 18, thus helping to maintain electrical contacts with PCB 30, and PCB 30 has channels (see FIG. 4) that are designed to receive columns 13 to provide a mating fit. In an especially preferred embodiment, each frictionally formed electrical lead (e.g., 15.1 and 16.1) is supported by its own unique channel of resilient housing formed by at least one column 13 and each unique channel is independently resilient.

After battery 10 is inserted into battery block 11, switch assembly 20 can be assembled to battery block 11. Switch assembly 20 can be designed so that it fits into an opening in battery block 11 and can be held in place by an interference fit. Switch assembly 20 has first and second switch assembly leads 20.1 and 20.2 that extend into PCB opening 19 in battery block 11. Switch assembly 20 can be constructed so that it extends above battery block 11, as shown in FIG. 1, although it is preferable that the top of switch assembly 20 is flush with battery block 11 so as to make a more compact assembled module. Also, although FIG. 1 shows the opening in which switch assembly block 20 is inserted has three sides, it need not be so, and could instead be a four-sided opening formed near the end of battery block 11 where PCB 30 is inserted. The details of switch assembly 20 are not critical to the present invention, and any number of different switch assemblies can be used, an example of which is U.S. Pat. No. 7,347,577, the details of which are specifically incorporated herein by reference.

After switch assembly 20 has been assembled to battery block 11 (see FIG. 1), PCB 30 is inserted into PCB opening 19. PCB 30 can carry a variety of electronics, shown generally as 33, to control electrical function of electrical assembly 1. (Electronics 33 can include, but do not necessarily need to include, a microprocessor.) Electronics 33 can be pre-mounted on PCB 30 before PCB is assembled to battery block 11. PCB 30 has multiple conductive traces 32 aligned so that when PCB 30 is inserted into PCB opening 19 they will make electrical contact with second lead 15.2 of conductor 15, second lead 16.2 of conductor 16, and first and second switch assembly leads 20.1 and 20.2, and it is especially preferred that insertion of PCB 30 causes leads 15.2 and 16.2 to bend over so as to secure electrical contact and also assist with creating an interference fit. PCB 30, in an especially preferred embodiment, has a radius 31 (FIG. 4) that increases the surface area for contact and PCB 30 is held within battery block 11 by an interference fit. Because battery block 11 is made of a resilient material, once PCB 30 has been inserted into PCB opening 19 and the four leads are electrically connected, the housing will bias the leads, each in its own unique channel, against their respective conductive members of PCB 30. PCB 30 can also have either male or female mating members (not shown) designed to mate in a snap fit fashion with corresponding female or male mating members in either or both of battery block 11 and ribbon block 41. Alternatively, and in an especially preferred embodiment, PCB 30 does not have any male or female mating members and, instead, battery block 11 and ribbon block 41 snap fit together, holding PCB 30 inside, so as to create a small, self-contained module that can be used, for example, in footwear, clothing and other uses. Such a module can have transparent or translucent walls and also contain one or more LEDs positioned within such walls that can be seen through the walls when the module is appropriately positioned in footwear, clothing or the like.

After PCB 30 is inserted into PCB opening 19 of battery block 11 it is then inserted into PCB opening 42 of ribbon block 41, although the order of such assembly steps can be reversed.

Ribbon block assembly 40 is an assembly of ribbon block 41 and ribbon wire assembly 50. Ribbon wire assembly 50 has at least one conductive wire 51, and usually groups of multiple conductive wires 51, each of which has an insulative covering 52 surrounding it, with a portion of insulative covering 52 being stripped away (shown as 53 in FIG. 7) so as to allow electrical contact to be made with the conductive wire. It is especially preferred that insulative covering 52 is only stripped away where electrical contact is to be made with the conductive wire and the back half of insulative covering 52 remains in place, as such back covering will assist in making a more secure electrical contact upon assembly when it is compressed by a forced connection between the exposed area of the conductive wire and the electrical conductor member to which it is being electrically connected.

Figure 6A:
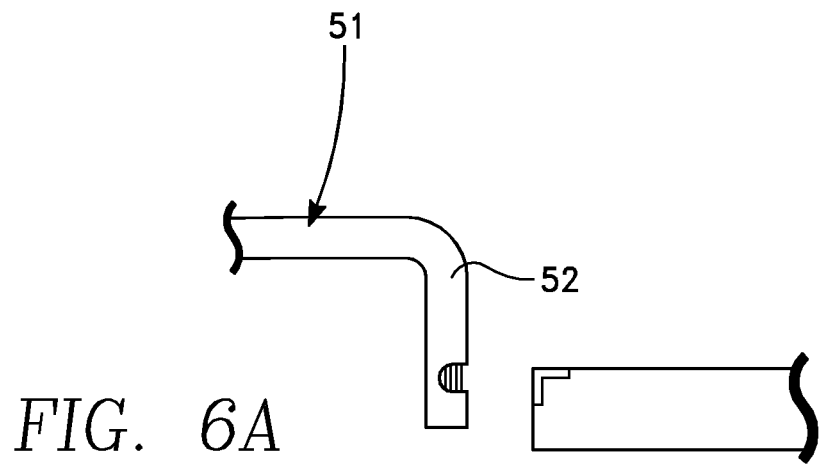
FIGS. 6A-6C illustrate contact being made between a PCB trace and a wire with a slit in its insulative covering.
Figure 6B:
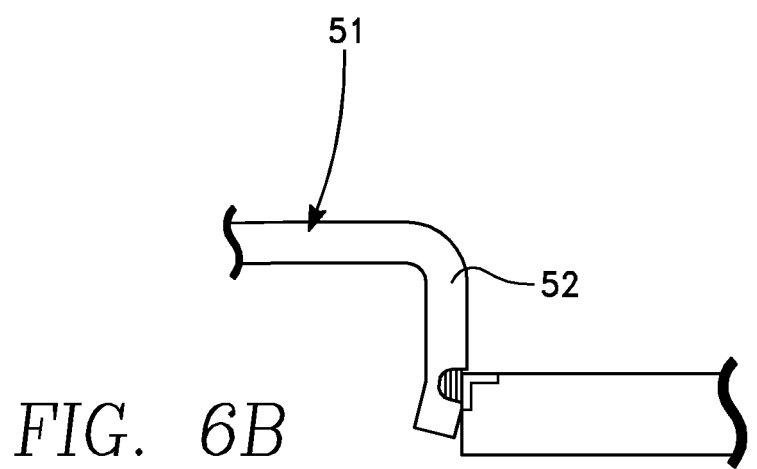
Figure 6C:
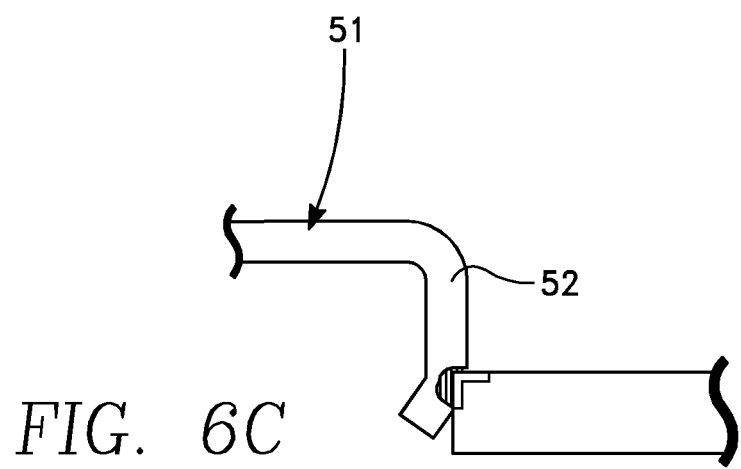

Ribbon block assembly 40 is inserted into ribbon opening 43 of ribbon block 41 where it is held in place by an interference fit. Once PCB 30 is fully inserted into PCB opening 42, conductive traces 32 will make electrical contact with conductive wires 51 at exposed portions 53 of insulative covering 52 (see FIG. 6). It has been found that such electrical contact can be made without the need to use through hole PCB connections, which reduces the cost of the PCB 30 needed in accordance with the present invention, by causing the exposed conductive wire to be bent over a top of PCB 30. (While it has been found that through hole PCB connections are not required for use with ribbon wire LEDs, to be described later, there may be other uses of electrical assemblies in which through hole PCB connections might be desirous, and such a possibility would still be within the scope of the present invention). It also bears note that the electrical connections formed between PCB 30 and both battery 10 and switch assembly 20 also do not require the use of through hole PCB connections. Finally, in an especially preferred embodiment, instead of stripping insulative covering 52 away, a slit is made in insulative covering 52 and then electrical contact is made between a conductive wire and a conductive trace 32 of a top surface of PCB 30, as is illustrated in FIGS. 6A-6C.

Figure 17:
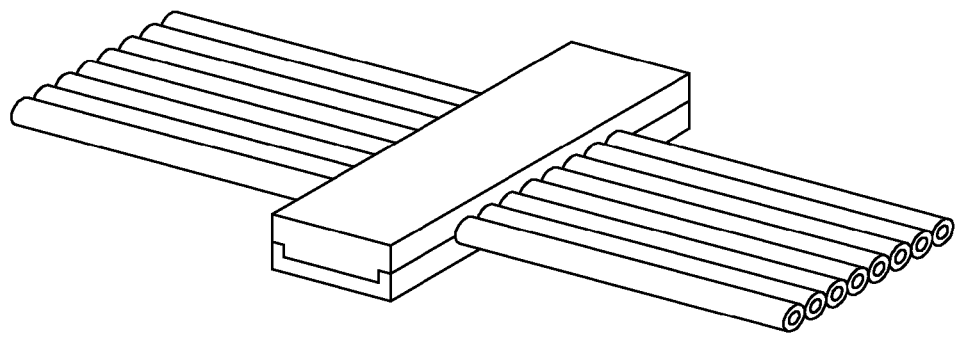
FIG. 17 illustrates an interconnector of two ribbon wires.
Figure 18:
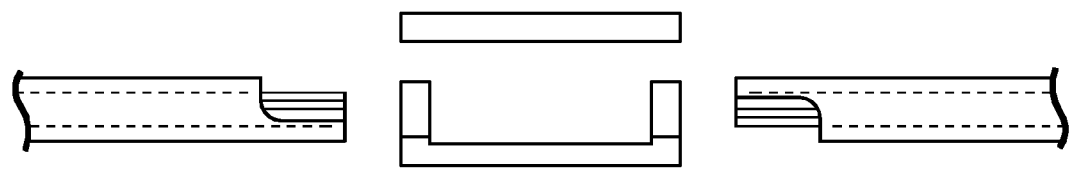
Figure 19:
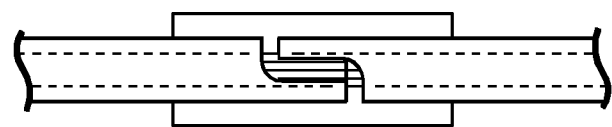
FIG. 19 is a phantom side view of FIG. 17, assembled and connected.

As is illustrated in FIGS. 17-19, two pairs of conductive wires can be connected together by a common housing, each of the pair of wires having an exposed area at its terminating end which overlaps the exposed area of the other pair of wires, both pairs of wires being held in the housing by an interference fit so that each pair of wires extends out of its own side of the housing and the two pairs of conductive wires are positioned in an end-to-end relationship relative to each other.

Electrical assembly 1 of the present invention has many distinct advantages.

One major advantage of electrical assembly 1 is that it can be assembled without the use of any solder. This represents a significant advantage, especially as there is more and more concern about environmental effects of solder.

Another major advantage of electrical assembly 1 is ease of manufacturing and assembly, which greatly reduces cost. Because solder is not required, no soldering iron steps are required, thus reducing cost. Also, electrical assembly 1 can be manufactured from subcomponents with just six assembly steps without using separate connecting parts, which greatly reduces its cost of manufacture. In a similar fashion, multiple PCBs can be electrically connected together in a single electrical assembly in which multiple PCBS are interconnected by use of one or more ribbon block assemblies.

Electrical assembly 1 is particularly well suited for use in applications where it can be used to power LEDs, some examples of which include footwear, clothing and strings of LEDs. In such a use one or more LEDs 60 can be assembled to electrical assembly 1, without the use of solder, by using a wire block assembly for each LED, which will now be described.

Figure 8:
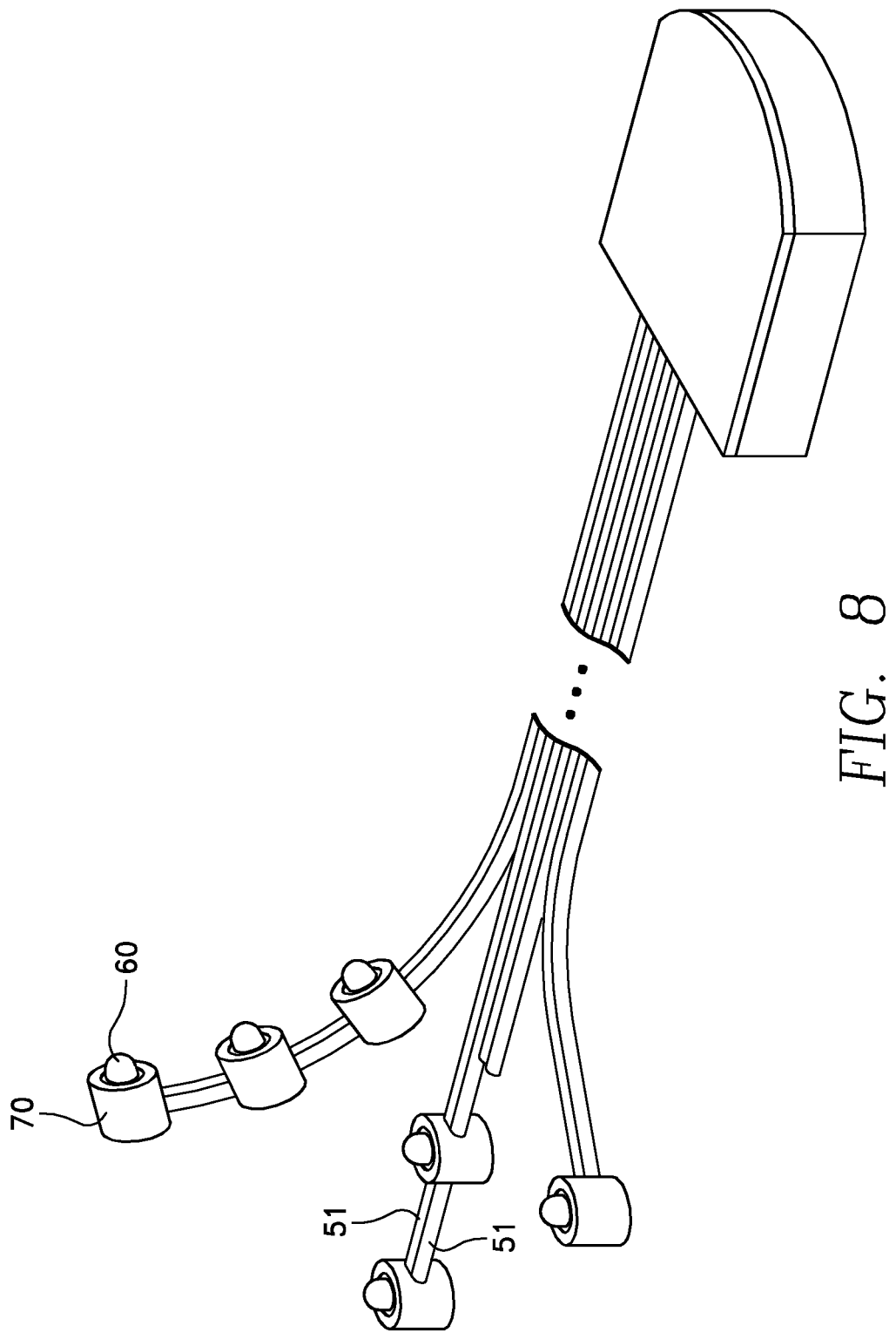
FIG. 8 illustrates the electrical assembly shown in FIG. 1 in a closed state, with multiple LEDs held in multiple wires of a ribbon wire.
Figure 13:
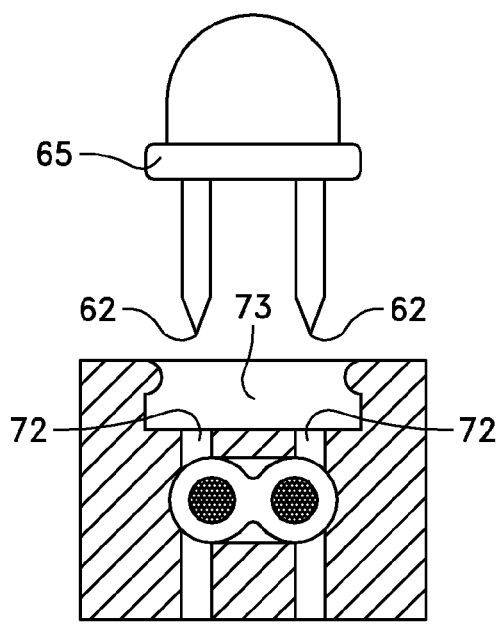

Each LED 60 can be assembled to its own pair of conductive wires 51 or multiple LEDs can be assembled on a single pair of conductive wires 51 (see FIG. 8). In an especially preferred embodiment of the present invention, LED leads end with a sharp pin point 62 (see FIG. 13) which is useful in piercing an insulative covering 52 of conductive wires 51.

Figure 9:
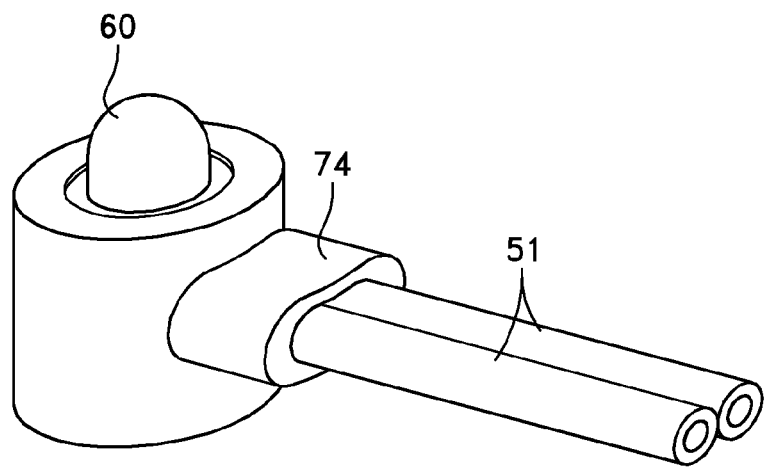
Figure 10:
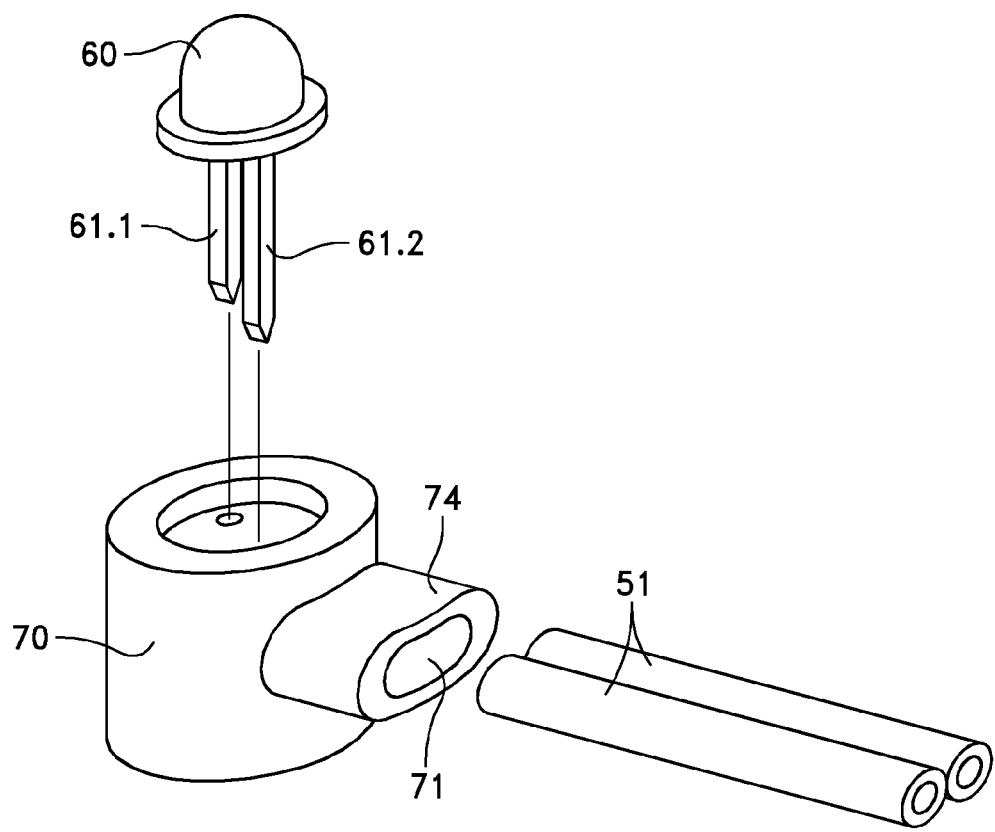
FIG. 10 is an exploded view of FIG. 9.

In accordance with an especially preferred embodiment of the present invention, an LED block 70 (see FIG. 10) has a wire hole 71 into which a pair of conductive wires 51 for a single LED 60 is inserted. In an especially preferred embodiment, illustrated in FIGS. 9 and 10, LED block 70 has a stress reliever 74 that extends outwardly around wire hole 71 to lessen stress that might otherwise be exerted upon a pair of conductive wires 51 inserted into LED block 70. When multiple LED blocks 70 are to be used on a pair of conductive wires 51, the blocks can be aligned along the pair of conductive wires 51 before LEDs 70 are inserted into each LED block 70. Because multiple LED blocks 70 can be used on a single pair of conductive wires 51, a large number of LEDs 70 can be supported by a single electrical assembly. For example, electrical assembly 1 can be used to support a ribbon block assembly 40 that has four pairs of conductive wires 51, each of which has up to nine (or more) LED blocks 70, which means the total assembly can support 36 or more LEDs, in a very inexpensive, yet reliable, assembly.

Figure 11:
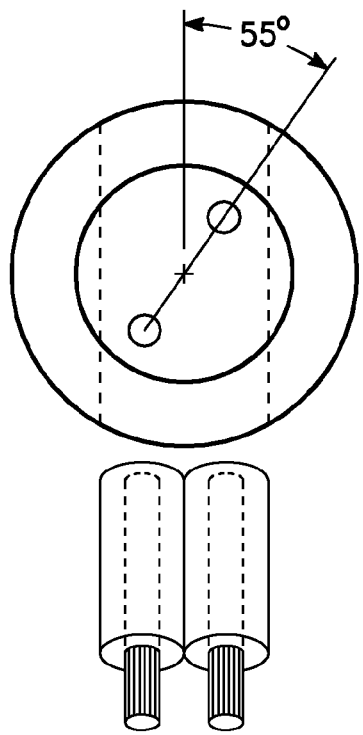
Figure 12:
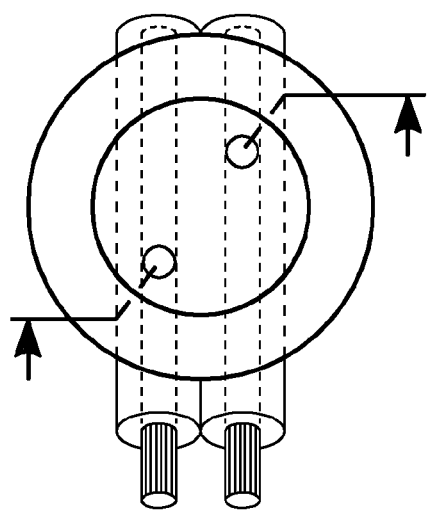
FIG. 12 illustrates the wire pair inserted into the LED block and how the LED leads will align with conductive members of the wire pair.
Figure 13A:
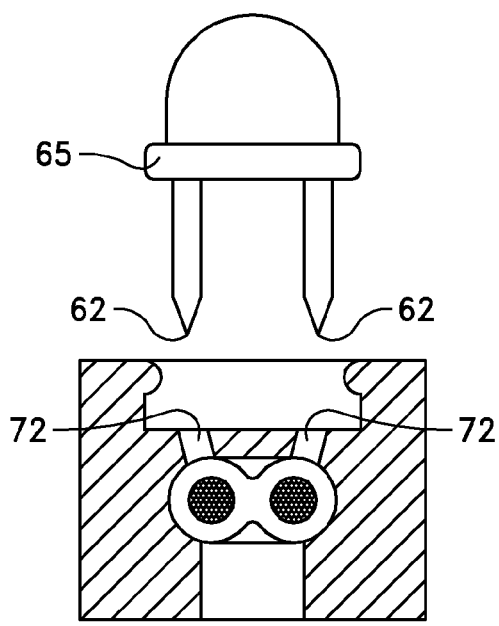
FIG. 13a shows an alternative embodiment to FIG. 13 in which the LED lead cavities are angled to facilitate alignment.
Figures 14, 15, 16:
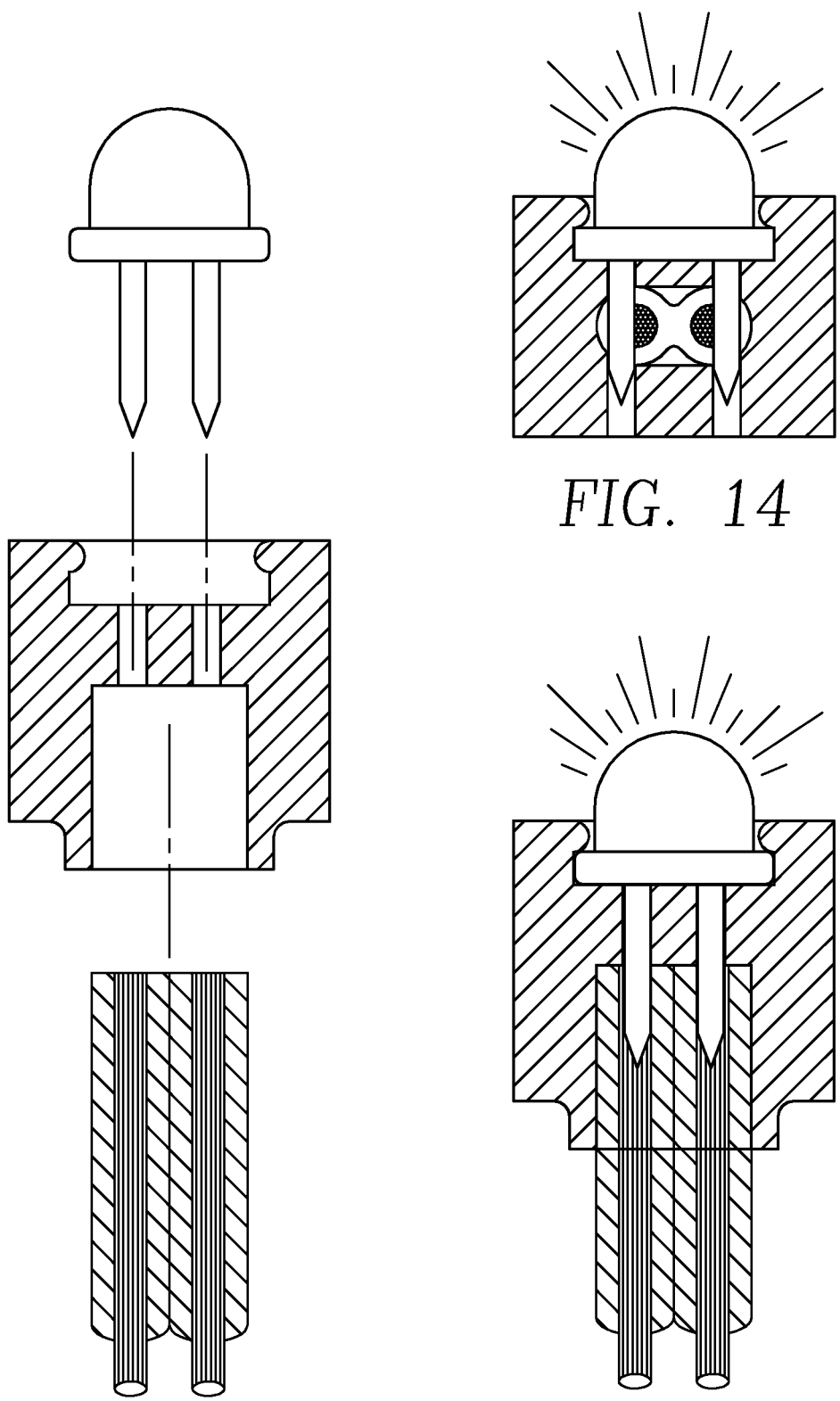

After a pair of conductive wires 51 is firmly in place in an LED block 70, first and second LED leads 61.1 and 61.2 of an LED 60 are each brought down and inserted into LED lead cavities 72 of LED block 70. LED lead cavities 72 can be designed to adjust the spacing of LED leads 61.1 and 61.2 and self-align them for insertion into a pair of conductive wires 51. Such self-alignment can be accomplished, for example, by forcing LED leads 61.1 and 61.2 together by narrowing the width of LED lead cavities 72 when the width between LED leads 61.1 and 61.2 is greater than the width of the pair of conductive wires 51 where they will make contact (see FIG. 13a). Also, if the width of the LED leads 61.1 and 61.2 is narrower than the width of the pair of conductive wires 51, then LED lead cavities 72 could be used to force LED leads 61.1 and 61.2 further apart and into alignment. As noted earlier, each lead 61.1 and 61.2 has a sharp pin point 62 that facilitates insertion of the leads through insulative covering 52 of conductive wires 51. Wire hole 71 and LED lead cavities 72, in an especially preferred embodiment (see FIG. 13), intersect at a right angle. Alternatively, the angle can vary (see FIGS. 11 and 12), or wire hole 71 and LED lead cavities 72 can even meet straight on (see FIG. 16), although such configurations are not preferred.

Accordingly, the present invention allows many LEDs to be used in a variety of applications without the need for any solder whatsoever and such construction can be achieved by a simple assembly process that greatly reduces manufacturing cost. This represents a significant advantage over prior art techniques, especially when many LEDs are being combined and electrically connected in parallel on a single pair of conductive wires 51.

Figure 2:
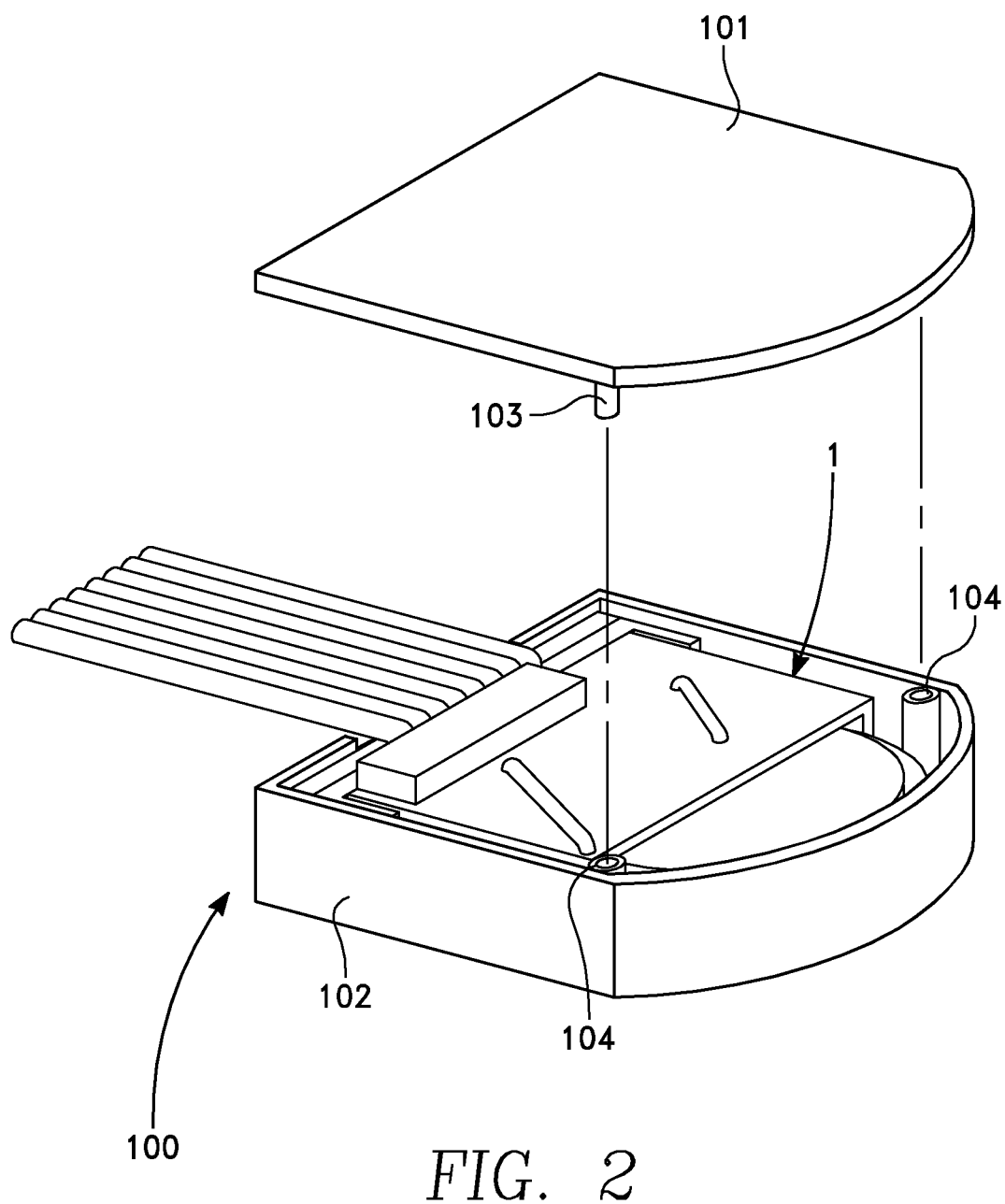
FIG. 2 is a cross sectional view of the assembly of FIG. 1 in an unexploded state.

So far the present disclosure has disclosed how a number of sub-assemblies can be assembled quickly, simply, and economically without the use of solder. A further embodiment will now be disclosed in which electrical assembly 1 is placed inside of an outer case 100 which can conveniently be constructed of plastic. As illustrated in FIG. 2, outer case 100 has case bottom 102 in which electrical assembly 1 is placed and case cover 101 which is then closed complete a sealed case. In an especially preferred embodiment, either case cover 101 or case bottom 102 has one or male members 103 designed to mate with counterpart one or more female members 104 found in its opposite member. The mating of one or more male and female members serves as an alignment guide as well as increasing structural integrity of a sealed case. After electrical assembly 1 is inserted into case bottom 102 and case cover 101 is closed, the case can be sonic welded. Wires 50 extend out of the sealed case, with the case acting both to insulate electrical assembly 1 and also to help insure the structural integrity of ribbon block assembly 40 which is now bent over ninety degrees by closing of case cover 101 and held in place by the sonic welding (see FIG. 2). (It is also further possible that sonic welding can cause insulative covering 52 of conductive wires 51 to weld to the parts of case 100, thus creating an even stronger bond, and making it less likely for ribbon wire assembly 50 to move in future use.)

Accordingly, the present invention discloses a simple, cost-effective electrical assembly and process of manufacture that is environmentally friendly and, in an especially preferred embodiment, well suited for use with LEDs. Moreover, the electrical assembly is compact and sturdy and well suited for use in a variety of applications, including for use in footwear and clothing.

Although the foregoing detailed description is illustrative of preferred embodiments of the present invention, it is to be understood that additional embodiments thereof will be obvious to those skilled in the art. For example, it is possible to connect multiple electrical assemblies 1 together so that a single switch assembly 20 triggers multiple chains of LEDs to activate at the same time. Such an assembly will be particularly useful for footwear and other applications where size and cost is important, but it is desired that a large number of LEDs (e.g., twelve), light at the same time. In addition, it is possible that multiple batteries can be aligned next to each other, instead of on top of each other, where there is more concern about vertical height of an assembled unit than horizontal length of the unit. Also, electrical components with multiple leads, instead of LEDs, can be connected to a pair of conductive wires using an electrical component block that applies the principals stated herein to such components. Further modifications are also possible in alternative embodiments without departing from the inventive concept.

Accordingly, it will be readily apparent to those skilled in the art that still further changes and modifications in the actual concepts described herein can readily be made without departing from the spirit and scope of the disclosed inventions as defined by the following claims.

What is claimed is:

1. An assembly, comprising:
   a pair of conductive wires, each of which is comprised of a conductor and an insulator; and
   a housing;
   wherein each of the pair of conductive wires is held in the housing by an interference fit between its conductor and the housing;
   wherein each of the pair of conductive wires has an exposed area which is not insulated by an insulator;
   wherein when the exposed area of each of the pair of conductive wires is forced into contact with its own electrical conductor member and its insulator is compressed by the forced connection between the exposed area and the electrical conductor member;
   wherein the electrical conductor member is a printed circuit board conductor;
   wherein the exposed area makes an electrical contact with the printed circuit board conductor without the need to use a through hole printed circuit board connection; and
   wherein the electrical contact is made by causing the exposed area to be bent over a top of the printed circuit board.

2. The assembly of claim 1 wherein the exposed area is formed by a slit in the insulator.

3. The assembly of claim 1 wherein the exposed area is formed by a stripping away a portion of the insulator.

4. The assembly of claim 1, wherein the printed circuit board conductor is located on a printed circuit board ("PCB") held by the housing and the housing is resilient.

5. The assembly of claim 4, wherein the PCB is held by an interference fit in a cavity of the housing.

6. The assembly of claim 5, further comprising a battery held by a battery interference fit in a battery cavity of the housing.

7. The assembly of claim 6, wherein insertion of the battery into the battery cavity to form the battery interference fit forces a pair of battery contacts into electrical contact with the battery.

8. The assembly of claim 7, further comprising a switch held by a switch interference fit with the housing, said switch having a first switch lead in electrical contact with a first switch conductive member of the PCB and a second switch lead in electrical contact with a second switch conductive lead of the PCB.

\* \* \* \* \*